Inventor:
HEINZ FLEISSNER

United States Patent Office 3,413,727
Patented Dec. 3, 1968

3,413,727
PROCESS AND APPARATUS FOR THE HEAT-TREATMENT OF AIR-PERMEABLE MATERIALS
Heinz Fleissner, Egelsbach, near Frankfurt am Main, Germany, assignor to VEPA A.G., Basel, Switzerland
Filed Dec. 9, 1966, Ser. No. 600,550
Claims priority, application Germany, Dec. 10, 1965, A 51,034
13 Claims. (Cl. 34—16)

ABSTRACT OF THE DISCLOSURE

The present disclosure relates to a process and apparatus for the heat-treatment of air permeable textile materials wherein the wet material to be heat-treated is conveyed on the surface of cylindrical sieve drums in a serpentine fashion through a treatment zone which is subdivided into at least two zones, while passing a heated gaseous treatment medium around and through said material. The quantity of the treatment medium circulated in the first zone per conveying element is smaller than in subsequent zones and the material in the first zone is subjected to a more powerful suction draft than in the subsequent zones.

Background of the invention

The present invention relates to a process and apparatus for heat-treatment, especially for drying air permeable materials, for example, textile materials, which in a wet condition are less air-permeable. More particularly, the present invention concerns the heat-treatment of textiles, such as, for example, tow, top, rayon staple and fabrics, wherein a gaseous treatment medium is passed around and through these materials during treatment. The material being treated is continuously guided on conveying elements subjected to a suction draft, preferably sieve drums, through a treatment zone which is subdivided into at least two zones in which the treatment medium is circulated.

For the heat-treatment, especially for drying air-permeable materials, it is well known to use sieve drum dryers with sieve drums subjected to a suction draft and fans correlated to the faces of these sieve drums. These sieve drum dryers are provided with a closed treatment chamber which is subdivided by partitions into several chambers. In the known sieve drum dryers large quantities of the treatment medium are drawn through the material which result in an extremely high drying capacity. In the case of materials which, in a wet condition, are partially impermeable to air, such as for example, tow, top, rayon staple, fabrics and the like, the installed fan capacity cannot be fully utilized for drawing the treatment medium through the textile material. However, in order to also utilize the fan capacity for these materials, it is known to increase the circulated air quantity by not fully covering the sieve drums with material so that at that portion of the sieve drums which are not covered with material, air can be drawn in. It has also been known to dispose baffles in the sieve drums in order to make it possible to draw air or other gaseous treatment medium into the sieve drums at the portions of the sieve drums which are not covered with the material being treated and to increase the quantity of air being circulated. Furthermore, it is known to provide the faces of the sieve drums with openings and to draw air into the sieve drums through these openings.

All of these embodiments are based on the idea of circulating the largest possible quantity of air in the dryer and increasing the drying capacity by having the circulated air penetrate part of the treatment material with the rest of the air drying and/or causing a heat exchange between the material to be processed and the air. Thus, as the air flows around the material being conveyed on the sieve drums, air penetration through the material is combined with parallel ventilation. All of these measures result in an increase in the drying capacity.

Although it has been found that by the aforementioned known measures an increase of the treatment capacity can be obtained, the economy of the treatment is little influenced, since by using larger air quantities, the losses due to air turbulence are correspondingly higher and thus the fans require correspondingly more energy. As electrical energy is generally many times more expensive than the energy required for heating the dryer, such as for example, heat provided by steam, gas or oil, it is desirable to keep the fan capacity as small as possible.

Accordingly, it is an object of the present invention to avoid these prior art disadvantages in heat-treatment processes and apparatus.

Another object of the present invention is to improve the economy of the heat-treatment, especially the drying of materials, by the use of the ventilation principle of passing the air through the material being processed.

A further object of the present invention is to provide an improved process and apparatus for controlling the quantity of the treatment medium circulated in the treatment chambers wherein the quantity of said medium circulated in the first chamber per conveying element is smaller than in subsequent chambers and the material in the first chamber is subjected to a more powerful suction draft than in subsequent chambers.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Summary of the invention

According to the present invention it has been found that an extremely economical heat-treatment, particularly, drying, of air-permeable materials can be obtained if the treatment process is subdivided into several stages and, if in the first stage, a smaller quantity of the treatment medium per conveying element and/or per fan is circulated, and if the vacuum acting upon the material, that is, the suction draft, is more powerful in the first stage than in a subsequent stage and/or stages. Thus, the present invention points in another direction than the direction followed up to now and considered expedient up to now. According to the present invention, it has been surprisingly found that by following the above steps not only the economy is substantially improved but at the same time the capacity is increased. This can be explained by the fact that heat exchange in the case of ventilation by passing the air through air permeable materials is substantially better than with parallel ventilation, in many cases about ten times better. The capacity can be further increased if, in a further embodiment of the present invention, higher treatment temperatures are used in the first stage than in the subsequent stages.

For carrying out the process according to the present invention, an apparatus is used which comprises a closed housing containing conveying elements subjected to a suction draft, preferably sieve drums, arranged in said housing. Fans which are correlated to the surface of the sieve drums are provided for circulating and drawing the treatment medium through the material being treated. In accordance with the present invention, these fans are graduated according to the degree of drying, that is, at the intake small high-pressure fans with low capacity are used and in later stages larger fans with a larger capacity are provided. It is advantageous to use fans with the same power requirements but with varying speeds. Using the small high-pressure fans running at high speeds on the wet, slightly air-permeable materials, a high partial vacuum is produced in the sieve drums of the first treatment zone, which makes it possible to draw larger amounts of the treatment medium through the material even if only slightly air-permeable materials are processed, than in the case with the usual negative pressure and suction drafts.

In the known devices using sieve drums arranged in two rows staggered to each other, which are separated from the fans correlated to their faces by a partition, only relatively small passage openings are provided between the fan chamber and the treatment chamber to the sieve drums. The air is constricted at these openings and considerably accelerated such that powerful whirls are formed in the treatment chamber providing losses in capacity. For this reason it is desirable to design the passage openings as large as possible. According to the present invention, enlargement of the passage openings can be achieved if the partition between the fan chamber and the treatment chamber is provided with a recess between two sieve drums of one row each, which recess preferably extends near to the sieve drums of the other row arranged between these two sieve drums. Accordingly, a considerable enlargement of the free cross sectional area can be obtained whereby the air passage from the fan chamber to the treatment chamber is considerably less disturbed. The losses by air turbulence can thus be substantially reduced. At the same time, a more uniform distribution of the air flow over the entire working width is obtained.

In the case of material which are easily blown off the sieve drums, it is well known to arrange concentrically curved sieve sheets at the surface of each sieve drum carrying the material, the center of curvature of the sieve sheets being situated in the sieve drum axis. With such devices and in a further embodiment of the present invention, the partition between the treatment chamber and the fan chamber is adapted to the sieve sheets, that is, the space outside the sieve sheets is designed as a free passage area between fan chamber and treatment chamber, and the sieve sheets limit the partition. In this arrangement, the sieve sheets may rest on the partition between the fan chamber and the treatment chamber and may be fastened to this partition. Although it is known to provide concentrically curved sieve sheets around the sieve drums for equalizing the air flowing back into the drum chamber, such sieve sheets have up to now been used only rarely because the sieve drums are rendered inaccessible. A better accessibility of the sieve drums can be obtained if the sieve sheet of each sieve drum comprises at least two easily adjustable and/or removable parts. Preferably these parts can be pushed together and/or towards each other.

The measures suggested in connection with the concentrical sieve sheets are not only advantageous for devices with two rows of sieve drums staggered to each other but also for an apparatus with sieve drums arranged in one row. Also, in the case of such arrangements and through an appropriate design of the partition between the fan chamber and the treatment chamber, a substantially larger free passage area for the air flowing into the treatment chamber can be obtained at optimum flow conditions.

Using the apparatus of the present invention it is often desirable to provide instead of the generally used indirect heating, a direct heating means because the resistance offered by the indirect heaters in the circulation path of the circulated treatment air is substantially eliminated. However, when using indirectly heated sieve drum dryers, the heaters can be advantageously arranged in the suction zone, that is in the sieve drums or around the sieve drums. In some cases it may also be of advantage to arrange the heaters directly around each fan wheel.

*Brief description of the drawings*

The present invention will become fully understood from the detailed description hereinbelow and the accompanying drawings which are given by way of illustration only and thus are not limitive of the present invention and wherein.

*Description of the preferred embodiments*

Figure 1:
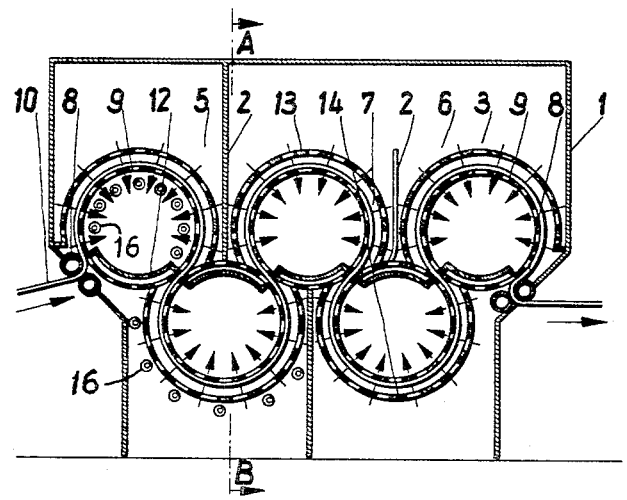
FIGURE 1 is a longitudinal section of the apparatus according to the present invention.
Figure 2:
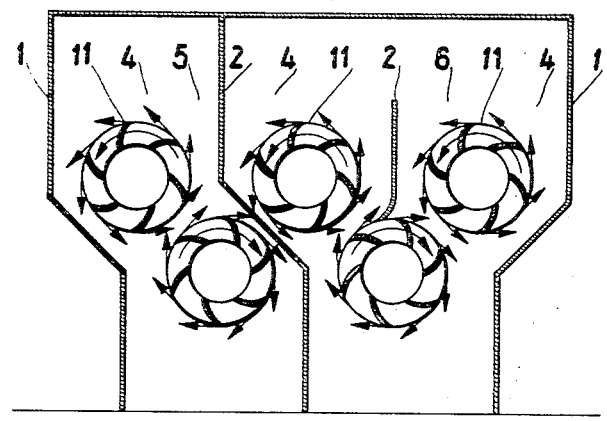
FIGURE 2 is a longitudinal cross-sectional view of the apparatus through the ventilator chamber according to FIGURES 1 and 3.

Referring now to the drawings wherein like reference numerals are used throughout the various views to designate like parts, the apparatus of the present invention comprises a closed housing 1 which is subdivided by partitions 2 into several chambers such as 5 and 6, each of which can be in turn subdivided into two chambers. Partition 7 is provided between a fan chamber 4 and a treatment chamber 3. The inlet and outlet of the housing is sealed by means of a pair of rollers 8. In the treatment chamber 3 two rows of sieve drums 9 which are subjected to a suction draft and staggered relative to each other are arranged for the continuous transportation of the material 10 to the treatment chamber 3. The sieve drums are rotated by a drive means 15. The suction draft in the sieve drums is produced by fan wheels 11 which are correlated to the faces of the sieve drums and which run at varying speeds. In chamber 5 at the intake of the dryer, in which chamber the material to be processed is still relatively wet and barely air-permeable, high-pressure fan wheels with small diameters are provided at the sieve drums, which fans run at lower speeds.

Figure 3:
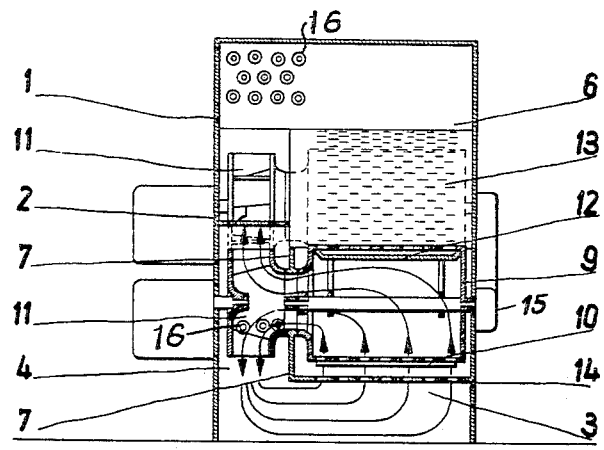
FIGURE 3 is a cross-sectional view through the apparatus according to FIGURE 1 along line A–B.

In the sieve drums the suction draft is interrupted by a baffle 12 at that portion of the sieve drum which is free from the material being processed. Around the sieve drums, sieve sheets are provided which are subdivided into at least two parts 13 and 14 and which are concentrically curved around the sieve drum axis. The partition 7 between the treatment chamber and the fan chamber is designed in such a way that it extends to those sieve sheets which are in turn connected with the partition. Using this design, a large free cross sectional area for the passage of the air from the fan chamber 4 to the treatment chamber 3 is obtained whereby a uniform distribution of the air over the whole working width of the drum is effected. Furthermore, the concentrically curved sieve sheets produce a completely radial flow of the air to the sieve drums. To heat the treatment medium, heating means 16 can be disposed in or around the sieve drums as shown in the first two drums of FIGURE 1 or in the suction zone or around the fan wheels as exemplified in FIGURE 3. It is apparent that other arrangements of the heating means can be provided in the circulation of the treatment medium.

Since modifications of this invention will be apparent to those skilled in the art, it is not desired to limit the invention to the exact construction shown and described. Accordingly, all suitable modifications and equivalence may be resorted to which fall within the scope of the appended claims.

It is claimed:

1. A process for drying air-permeable materials which are less air-permeable when wet which comprises continuously conveying the wet material to be treated on an element subjected to a suction draft through a treatment zone which is subdivided into at least two zones, passing a heated gaseous treatment medium around and through the material being treated, the quantity of the treatment medium circulated in the first zone per conveying element being smaller than in subsequent zones, and the material in the first zone being subjected to a more powerful suction draft in the first zone than in subsequent zones.

2. The process of claim 1, wherein the material to be treated is a textile material.

3. The process of claim 1, wherein a higher temperature is utilized in the first zone than in subsequent zones.

4. The process of claim 1, wherein the material to be treated is conveyed through the treatment zones in a serpentine fashion.

5. A heat-treating apparatus which comprises a closed housing which is partially subdivided into more than one chamber by partition means, at least one cylindrical sieve drum with a perforated surface rotatably disposed within each of said chambers, the cylindrical surface of said sieve drum serving as a conveying means and providing a continuous surface through said chambers, means for introducing the material to be heat-treated to said conveying means, heating means disposed in the circulation of the treatment medium for heating said treatment medium, vacuum means communicating with the interior of the cylindrical sieve drum for circulating and drawing the treatment medium through the material being treated, said vacuum means comprising small high-pressure fans with small capacities associated with the sieve drums in the inlet chamber and larger fans with larger capacities associated with the sieve drums in the subsequent chambers and outlet means for removing said heat-treated material from the housing.

6. The apparatus of claim 5, wherein the fans have the same energy requirements but varying speeds.

7. The apparatus of claim 5, wherein the sieve drums are arranged in the closed housing in two rows which are staggered relative to each other and wherein the sieve drums are separated from the fans correlated to their faces by a partition, said partition between two sieve drums of one row being provided with a recess which extends in close proximity to the sieve drum of another row staggered between these two sieve drums.

8. The apparatus of claim 7, wherein concentrically curved sieve sheets are arranged at that part of the sieve drum which carries the material being treated, and wherein the partition between the sieve drums and the fans is adapted to the sieve sheets and limited by the sieve sheets.

9. The apparatus of claim 8, wherein the sieve sheets of each sieve drum comprises at least two adjustable components which are readily removable.

10. The apparatus of claim 9, wherein the components of each sieve sheet can be pushed together or towards each other.

11. The apparatus of claim 5, wherein direct heating means are provided to heat the circulating treatment medium.

12. The apparatus of claim 11, wherein, in the suction zone of the apparatus the heaters are arranged in and around the sieve drums.

13. The apparatus of claim 11, wherein the heaters are arranged around the fan wheels.

References Cited

UNITED STATES PATENTS

| 1,577,839 | 3/1926 | Moone | 34—115 |
| 3,140,157 | 7/1964 | Fleissner | 34—115 |
| 3,196,555 | 7/1965 | Friedl | 34—115 |
| 3,303,576 | 2/1967 | Sisson | 34—15 |

WILLIAM J. WYE, *Primary Examiner.*